(12) United States Patent
Morita

(10) Patent No.: US 8,692,924 B2
(45) Date of Patent: Apr. 8, 2014

(54) IMAGE SENSING AND DEVELOPMENT PROCESSING APPARATUS AND CONTROL METHOD THEREOF

(75) Inventor: Hiroyasu Morita, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 372 days.

(21) Appl. No.: 13/155,877

(22) Filed: Jun. 8, 2011

(65) Prior Publication Data

US 2011/0317035 A1    Dec. 29, 2011

(30) Foreign Application Priority Data

Jun. 25, 2010   (JP) .................................. 2010-145527

(51) Int. Cl.
*H04N 5/217* (2011.01)
*H04N 5/222* (2006.01)

(52) U.S. Cl.
USPC ...................................... 348/333.12; 348/241

(58) Field of Classification Search
None
See application file for complete search history.

(56) References Cited

U.S. PATENT DOCUMENTS

| 8,154,646 | B2 * | 4/2012 | Yanagi ...................... 348/333.05 |
| 8,289,433 | B2 * | 10/2012 | Hara et al. ................ 348/333.02 |
| 2004/0046873 | A1 * | 3/2004 | Kubo et al. ................ 348/222.1 |
| 2009/0225202 | A1 * | 9/2009 | Hata ............................ 348/241 |
| 2010/0097481 | A1 * | 4/2010 | Taoka ...................... 348/208.13 |

FOREIGN PATENT DOCUMENTS

| CN | 101211412 A | 7/2008 |
| CN | 101242474 A | 8/2008 |
| CN | 101489021 A | 7/2009 |
| JP | 4126640 | 7/2008 |
| WO | 2009/116962 A1 | 9/2009 |

OTHER PUBLICATIONS

Jul. 2, 2013 Chinese Office Action, that issued in Chinese Patent Application No. 201110173572.6.

* cited by examiner

*Primary Examiner* — Albert Cutler
(74) *Attorney, Agent, or Firm* — Cowan, Liebowitz & Latman, P.C.

(57) ABSTRACT

An image sensing apparatus comprises an image sensing unit capturing an object image, a saving unit saving a captured image data, a development processing unit reading out the image data and execute development processing for the image data to generate new image data, a setting unit setting a parameter for the development processing, a display unit displaying a development processing result and an operation unit allowing a user to perform one of enlargement and reduction of the displayed image, wherein when a first parameter for which optical system correction processing is performed and a second parameter for which the correction processing is not performed are set, the development processing unit executes development processing, to which the first parameter is applied, when a change to enlarged display is not made, and executes development processing, to which the first and second parameters are applied, when a change to enlarged display is made.

7 Claims, 10 Drawing Sheets

FIG. 3A

200
[GUI DISPLAY]
WB: AUTO
CONTRAST: WEAK
MAGNIFICATION CHROMATIC ABERRATION: OFF
[IMAGE PROCESSING]
WB: AUTO
CONTRAST: WEAK
MAGNIFICATION CHROMATIC ABERRATION: OFF

201
[GUI DISPLAY]
WB: SUNLIGHT
CONTRAST: WEAK
MAGNIFICATION CHROMATIC ABERRATION: OFF
[IMAGE PROCESSING]
WB: SUNLIGHT
CONTRAST: WEAK
MAGNIFICATION CHROMATIC ABERRATION: OFF

202
[GUI DISPLAY]
WB: SUNLIGHT
CONTRAST: WEAK
MAGNIFICATION CHROMATIC ABERRATION: ON
[IMAGE PROCESSING]
WB: SUNLIGHT
CONTRAST: WEAK
MAGNIFICATION CHROMATIC ABERRATION: OFF

203
[GUI DISPLAY]
WB: SUNLIGHT
CONTRAST: STRONG
MAGNIFICATION CHROMATIC ABERRATION: ON
[IMAGE PROCESSING]
WB: SUNLIGHT
CONTRAST: STRONG
MAGNIFICATION CHROMATIC ABERRATION: OFF

204
[GUI DISPLAY]
WB: SUNLIGHT
CONTRAST: STRONG
MAGNIFICATION CHROMATIC ABERRATION: ON
[IMAGE PROCESSING]
WB: SUNLIGHT
CONTRAST: STRONG
MAGNIFICATION CHROMATIC ABERRATION: ON

205
[GUI DISPLAY]
WB: SUNLIGHT
CONTRAST: STRONG
MAGNIFICATION CHROMATIC ABERRATION: ON
[IMAGE PROCESSING]
WB: SUNLIGHT
CONTRAST: STRONG
MAGNIFICATION CHROMATIC ABERRATION: ON

206
[GUI DISPLAY]
WB: SUNLIGHT
CONTRAST: STRONG
MAGNIFICATION CHROMATIC ABERRATION: ON
[IMAGE PROCESSING]
WB: SUNLIGHT
CONTRAST: STRONG
MAGNIFICATION CHROMATIC ABERRATION: ON

207
[GUI DISPLAY]
WB: SUNLIGHT
CONTRAST: STRONG
MAGNIFICATION CHROMATIC ABERRATION: ON
[IMAGE PROCESSING]
WB: SUNLIGHT
CONTRAST: STRONG
MAGNIFICATION CHROMATIC ABERRATION: ON
[FILE NAME]
IMG_0001.JPG

FIG. 3B

208
[GUI DISPLAY]
WB: AUTO
CONTRAST: WEAK
MAGNIFICATION CHROMATIC ABERRATION: OFF
[IMAGE PROCESSING]
WB: AUTO
CONTRAST: WEAK
MAGNIFICATION CHROMATIC ABERRATION: OFF

209
[GUI DISPLAY]
WB: SUNLIGHT
CONTRAST: WEAK
MAGNIFICATION CHROMATIC ABERRATION: ON
[IMAGE PROCESSING]
WB: SUNLIGHT
CONTRAST: WEAK
MAGNIFICATION CHROMATIC ABERRATION: ON

210
[GUI DISPLAY]
WB: SUNLIGHT
CONTRAST: WEAK
MAGNIFICATION CHROMATIC ABERRATION: ON
[IMAGE PROCESSING]
WB: SUNLIGHT
CONTRAST: WEAK
MAGNIFICATION CHROMATIC ABERRATION: ON

211
[GUI DISPLAY]
WB: SUNLIGHT
CONTRAST: WEAK
MAGNIFICATION CHROMATIC ABERRATION: ON
[GUI DISPLAY]
WB: SUNLIGHT
CONTRAST: WEAK
MAGNIFICATION CHROMATIC ABERRATION: ON

212
[GUI DISPLAY]
WB: SUNLIGHT
CONTRAST: WEAK
MAGNIFICATION CHROMATIC ABERRATION: ON
[IMAGE PROCESSING]
WB: SUNLIGHT
CONTRAST: WEAK
MAGNIFICATION CHROMATIC ABERRATION: ON

213
[GUI DISPLAY]
WB: SUNLIGHT
CONTRAST: WEAK
MAGNIFICATION CHROMATIC ABERRATION: ON
[IMAGE PROCESSING]
WB: SUNLIGHT
CONTRAST: WEAK
MAGNIFICATION CHROMATIC ABERRATION: ON

214
[GUI DISPLAY]
WB: SUNLIGHT
CONTRAST: STRONG
MAGNIFICATION CHROMATIC ABERRATION: ON
[IMAGE PROCESSING]
WB: SUNLIGHT
CONTRAST: STRONG
MAGNIFICATION CHROMATIC ABERRATION: ON
[FILE NAME]
IMG_0001.JPG

[GUI DISPLAY]
WB: AUTO
CONTRAST: WEAK
MAGNIFICATION CHROMATIC ABERRATION: OFF
[IMAGE PROCESSING]
WB: AUTO
CONTRAST: WEAK
MAGNIFICATION CHROMATIC ABERRATION: OFF

216

[GUI DISPLAY]
WB: SUNLIGHT
CONTRAST: WEAK
MAGNIFICATION CHROMATIC ABERRATION: OFF
[IMAGE PROCESSING]
WB: SUNLIGHT
CONTRAST: WEAK
MAGNIFICATION CHROMATIC ABERRATION: OFF

217

[GUI DISPLAY]
WB: AUTO
CONTRAST: WEAK
MAGNIFICATION CHROMATIC ABERRATION: OFF
[GUI DISPLAY]
WB: AUTO
CONTRAST: WEAK
MAGNIFICATION CHROMATIC ABERRATION: OFF

218

[GUI DISPLAY]
WB: AUTO
CONTRAST: WEAK
MAGNIFICATION CHROMATIC ABERRATION: ON
[IMAGE PROCESSING]
WB: AUTO
CONTRAST: WEAK
MAGNIFICATION CHROMATIC ABERRATION: OFF

219

[GUI DISPLAY]
WB: AUTO
CONTRAST: WEAK
MAGNIFICATION CHROMATIC ABERRATION: OFF
[IMAGE PROCESSING]
WB: AUTO
CONTRAST: WEAK
MAGNIFICATION CHROMATIC ABERRATION: OFF

IMAGE SENSING AND DEVELOPMENT PROCESSING APPARATUS AND CONTROL METHOD THEREOF

BACKGROUND OF THE INVENTION

1. Field of the Invention

The present invention relates to development processing for shot image data.

2. Description of the Related Art

There has conventionally been an image sensing apparatus having a function of generating new image data by setting various parameters associated with development processing for shot image data and executing redevelopment processing for this data. Examples of the parameters for shot image data include white balance and contrast. There have also been processing to reduce noise in image data containing large amounts of noise, and filter-system processing, such as soft focusing that uses blurring.

Japanese Patent No. 04126640 describes a technique that sets a new parameter for shot image data and displays the result of executing redevelopment processing for this data so that the user can change the parameter more than once while viewing this result and can save this result as new image data.

Although redeveloped image data can be displayed in Japanese Patent No. 04126640 mentioned above, it takes much time to display and present the development processing result to the user, depending on the details of the development processing, thus degrading the operability. Also, because the resolution of an image which can be displayed on an image sensing apparatus has a limit, it is often difficult to visually recognize the effect of development processing, depending on the types of various parameters associated with the development processing.

SUMMARY OF THE INVENTION

The present invention has been made in consideration of the aforementioned problems, and realizes a technique, in which the effect of development processing is displayed only when this effect is visible to reduce the arithmetic processing load imposed on the development processing, thus suppressing degradation in operability.

In order to solve the aforementioned problems, the present invention provides an image sensing apparatus comprising: an image sensing unit configured to capture an object to obtain image data; a saving unit configured to save the image data obtained by the image sensing unit; a development processing unit configured to read out the image data saved in the saving unit and execute development processing for the image data to generate new image data; a setting unit configured to set a parameter for use in the development processing; a display unit configured to display a result of executing development processing by the development processing unit using the parameter set by the setting unit; and an operation unit configured to allow a user to perform one of enlargement and reduction of the image displayed on the display unit, wherein when the setting unit sets a first parameter for which optical system correction processing is performed and a second parameter for which optical system correction processing is not performed, the development processing unit executes development processing, to which the first parameter is applied, when a change to enlarged display is not made by the operation unit, and the development processing unit executes development processing, to which the first parameter and the second parameter are applied, when a change to enlarged display is made by the operation unit.

In order to solve the aforementioned problems, the present invention provides a control method of an image sensing apparatus including an image sensing unit configured to capture an object to obtain image data; a saving unit configured to save the image data obtained by the image sensing unit; a development processing unit configured to read out the image data saved in the saving unit and execute development processing for the image data to generate new image data; a setting unit configured to set a parameter for use in the development processing; a display unit configured to display a result of executing development processing by the development processing unit using the parameter set by the setting unit; and an operation unit configured to allow a user to perform one of enlargement and reduction of the image displayed on the display unit, the method comprising the steps of: executing, when the setting unit sets a first parameter for which optical system correction processing is performed and a second parameter for which optical system correction processing is not performed, development processing, to which the first parameter is applied, when a change to enlarged display is not made by the operation unit; and executing development processing, to which the first parameter and the second parameter are applied, when a change to enlarged display is made by the operation unit.

According to the present invention, the effect of development processing is displayed only when this effect is visible to make it possible to reduce the arithmetic processing load imposed on the development processing, thus suppressing degradation in operability.

Further features of the present invention will become apparent from the following description of exemplary embodiments with reference to the attached drawings.

BRIEF DESCRIPTION OF THE DRAWINGS

FIGS. 2A-1 and 2A-2 are flowcharts showing redevelopment processing by the image sensing apparatus according to the embodiment;

FIGS. 2B-1 and 2B-2 are flowcharts showing another redevelopment processing by the image sensing apparatus according to the embodiment;

FIGS. 2C-1 and 2C-2 are flowcharts showing still another redevelopment processing by the image sensing apparatus according to the embodiment; and FIGS. 3A to 3C are views illustrating images of redevelopment processing results and development parameters.

DESCRIPTION OF THE EMBODIMENTS

Embodiments of the present invention will be described in detail below with reference to the accompanying drawings.

The following embodiments are merely examples for practicing the present invention. The embodiments should be properly modified or changed depending on various conditions and the structure of an apparatus to which the present invention is applied. The present invention should not be limited to the following embodiments.

[Apparatus Configuration]

Figure 1:
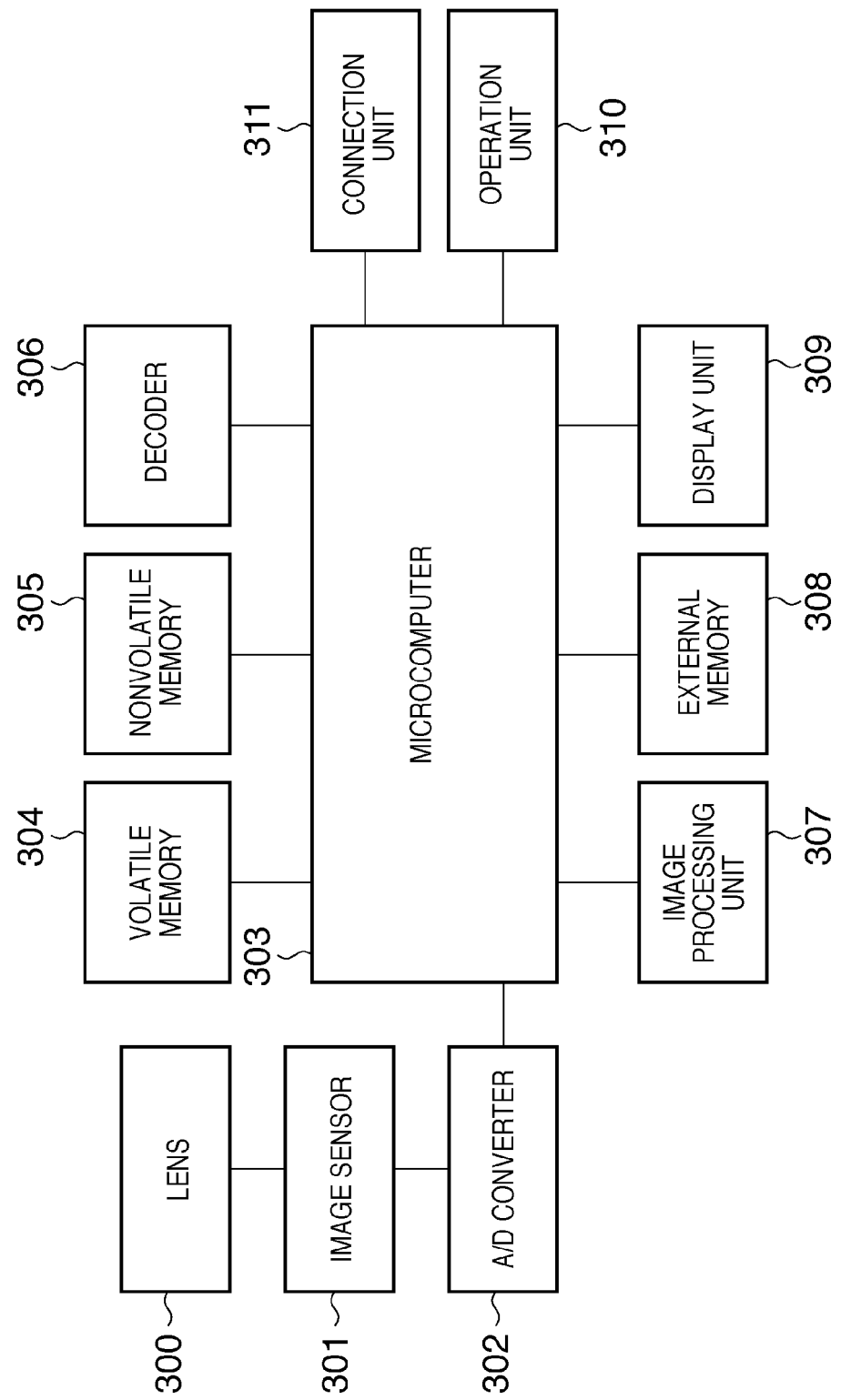
FIG. 1 is a block diagram showing the configuration of an image sensing apparatus according to an embodiment of the present invention.

The configuration of an image sensing apparatus which executes redevelopment processing according to the embodiment will be described first with reference to FIG. 1. Referring to FIG. 1, reference numeral 300 denotes a shooting lens; 301, an image sensor which uses a CCD or CMOS sensor and converts an object image formed by the shooting lens 300 into an electrical signal; 302, an A/D converter which converts the analog output signal from the image sensor 301 into a digital signal; 303, a microcomputer which controls the overall image sensing apparatus by, for example, controlling each constituent element and performing data processing; and 304, a volatile memory which temporarily holds raw image data converted into a digital signal by the A/D converter 302.

Reference numeral 305 denotes a nonvolatile memory which stores a program that is executed by the image sensing apparatus and processed by the microcomputer 303; 306, a decoder which executes, for example, analysis of an image file read out from an external memory 308, decompression of image data, and data format conversion processing; 307, an image processing unit which executes image processing for raw image data converted into a digital signal by the A/D converter 302; 308, an external memory which includes, for example, a memory card such as CompactFlash® or SmartMedia or a hard disk drive. The microcomputer 303 converts the image data processed by the image processing unit 307 into a predetermined file format, and outputs the converted data to the external memory 308. Also, the microcomputer 303 reads an image file from the external memory 308, decompresses the image data temporarily held in the volatile memory 304 using the decoder 306, performs data format conversion, and thereupon executes development processing again using the image processing unit 307, thereby reconstructing an image file. Moreover, the microcomputer 303 has a function of, for example, writing the redevelopment processing result on the external memory 308.

Reference numeral 309 denotes a display unit such as a liquid crystal panel, which displays, for example, an image read out from the external memory 308, an image having undergone redevelopment processing by the image processing unit 307, and a newly set parameter; 310, an operation unit such as a switch or a button, which can be operated by the user and allows him/or her to perform various operations while viewing a GUI displayed on the display unit 309; and 311, a connection unit 311 such as a USB, which is used to communicably connect an external device to the image sensing apparatus. As the external device, a display device such as an external monitor or a television is assumed.

In the first to third embodiments to be described below, the image sensing apparatus can change the parameter only while an image with a fit size is displayed on the display unit 309, and displays the result of executing redevelopment processing using the reset parameter. Also, although the image sensing apparatus can enlarge or reduce the displayed image, it is prohibited from changing the parameter and is permitted only to change the position at which an enlarged image is displayed while the displayed image is enlarged.

Although a change in parameter is permitted only in fit-size image display in this embodiment, the present invention is not limited to this, and any value can be used as a threshold of the image size.

As development parameters (first parameters), parameters such as white balance and contrast, for which optical system correction processing is performed, are assumed. As an optical system correction parameter (second parameter), the magnification chromatic aberration for which optical system correction processing is not performed, for example, is assumed. For the sake of descriptive simplicity, in the first to third embodiments to be described later, the parameters used in shooting a target image to be redeveloped are set as "White Balance: Auto", "Contrast: Weak", and "Magnification Chromatic Aberration Correction: OFF". Also, the target image file to be redeveloped is saved in a memory card serving as the external memory 308.

First Embodiment

Figures 1, 2A:
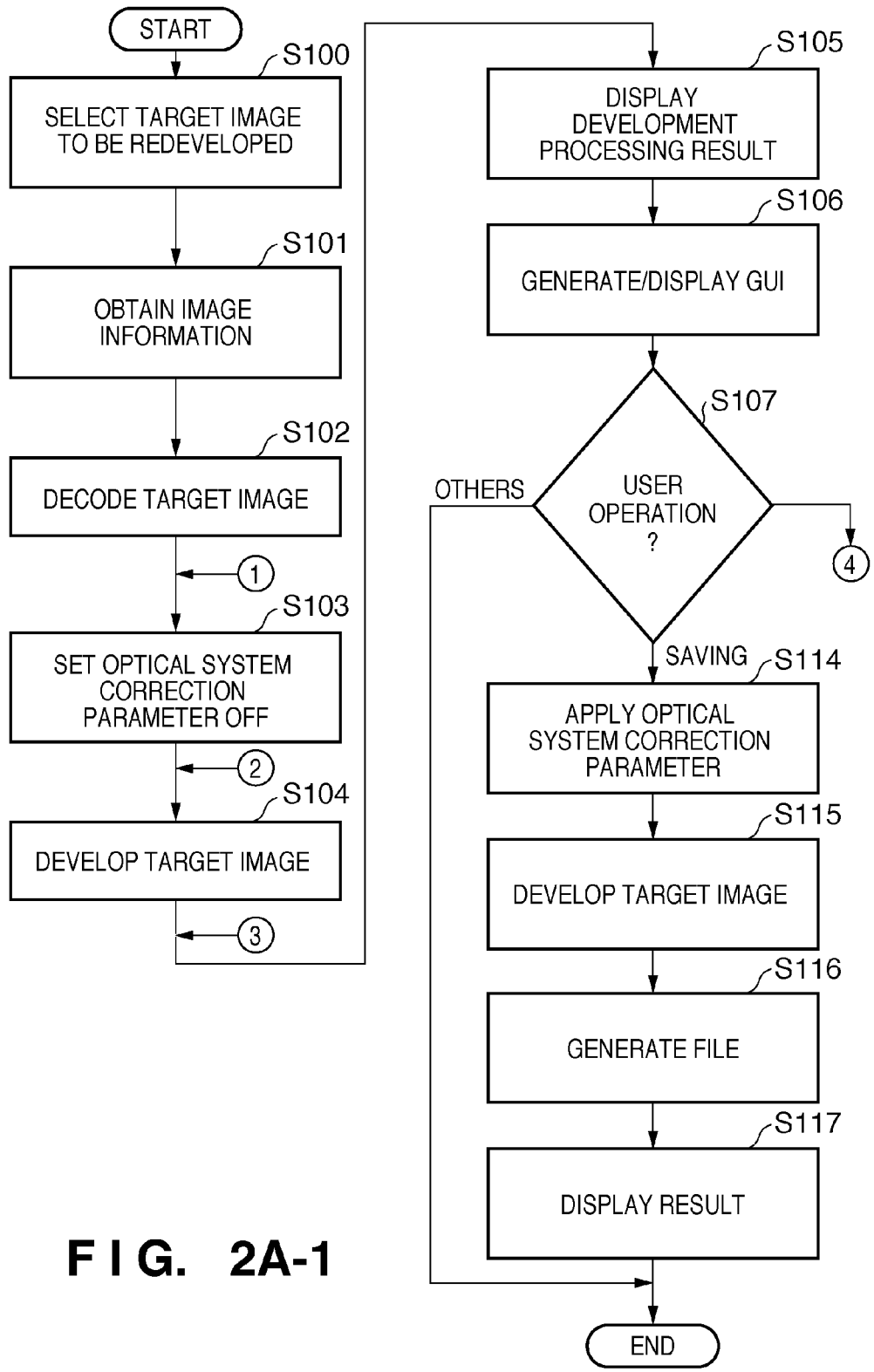
Figures 2, 2A:
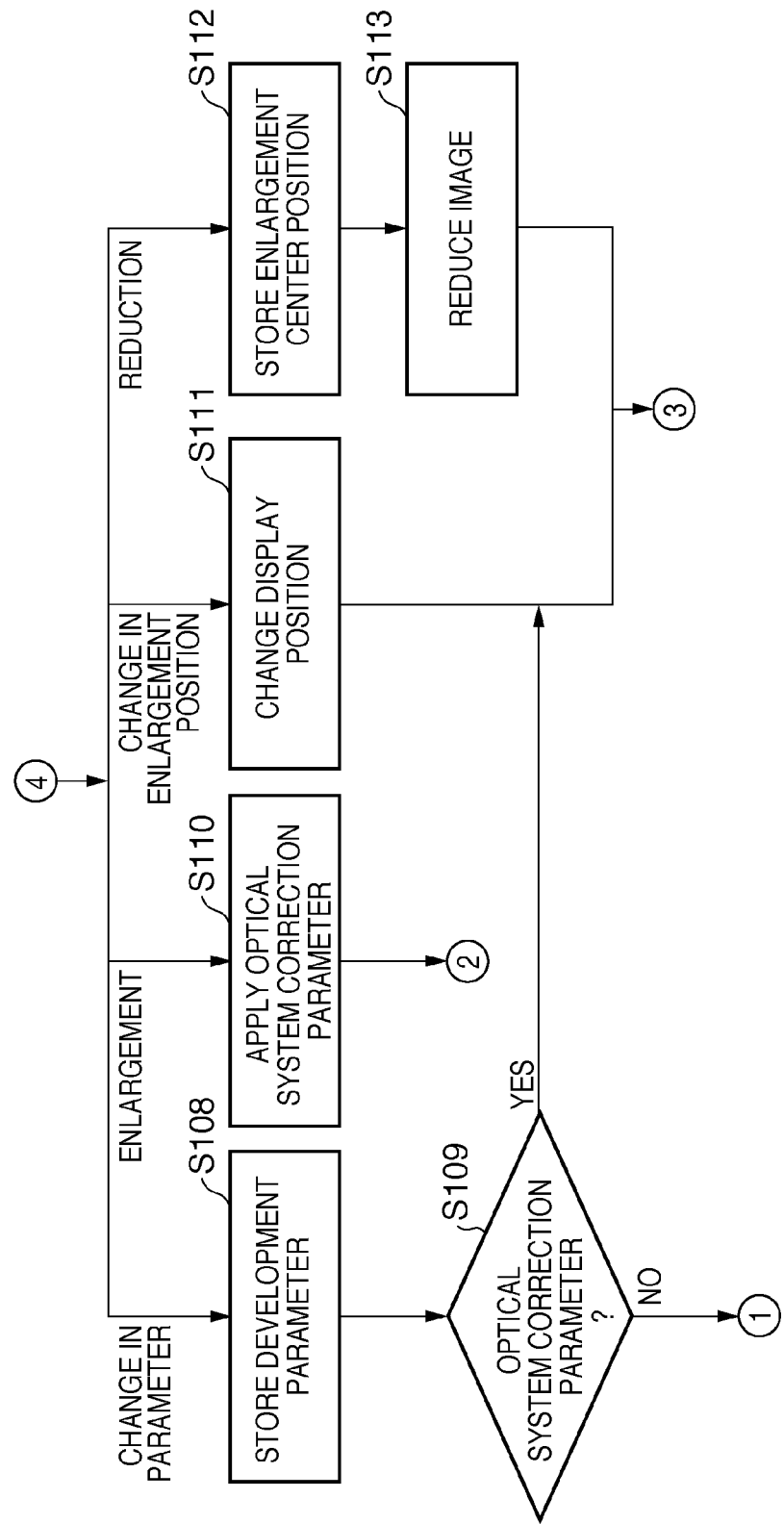

A procedure for executing redevelopment processing, which reflects the optical system correction parameter, at the timing of enlarged display of an image will be described below as the first embodiment according to the present invention with reference to FIGS. 2A-1 and 2A-2. FIGS. 2A-1 and 2A-2 are flowcharts showing redevelopment processing by an image sensing apparatus according to the first embodiment. The redevelopment processing in this embodiment is implemented when a microcomputer 303 of the image sensing apparatus shown in FIG. 1 loads a redevelopment processing program stored in a nonvolatile memory 305 into a volatile memory 304 and executes this program, unless otherwise specified.

Referring to FIGS. 2A-1 and 2A-2, when the user selects a redevelopment function via a menu screen or playback screen displayed on a display unit 309 or an operation unit 310, the process proceeds to a target image selection processing (S100). In the target image selection processing, image files saved in the memory card are displayed one by one or in the form of a list to allow the user to select a target image file to be redeveloped. Although only one target image file is selected in this embodiment, a plurality of image files may be selected at once.

When the target image file to be redeveloped is selected in step S100, the selected image file is read out from the memory card and temporarily held in the volatile memory 304, so the microcomputer 303 obtains information from the read out image file (S101). The information obtained from the selected image file includes herein items necessary for redevelopment processing, such as the development parameters in shooting, the image size, and the image format. The microcomputer 303 decodes the target image file by a decoder 306 using the obtained information (S102), and holds, in the volatile memory 304, image data converted into a data format which can be handled by an image processing unit 307. This decoded image data becomes original image data obtained upon changing the development parameter. This original image data is held in the volatile memory 304 until redevelopment processing is completed.

The state of the optical system correction parameter is checked based on the image information obtained in step S101 (S103). In this embodiment, the magnification chromatic aberration is assumed and set "OFF" in shooting, so the parameter in shooting can be directly used. When this parameter is "ON" in shooting, it takes much time to perform optical system correction processing, so the magnification chromatic aberration is set "OFF" in step S103 and the development parameters are set. The image processing unit 307 executes development processing for the target image file using the set development parameters (S104), displays a development processing result of the target image on the display unit 309 (S105), and displays, for example, parameters, with which redevelopment processing is possible, in the form of a GUI (S106). Reference numeral 200 in FIG. 3A exemplifies the processing result in this case, in which an image in the upper portion shows the development processing result and texts in the lower portion show the development parameters at that time. In installing the GUI on the image sensing apparatus, development parameters and icons for various settable operations, for example, are superimposed and displayed on the display image, but are shown separately from this display image in FIG. 3A for the sake of descriptive convenience. In this state, the apparatus stands by for an operation by the user (S107).

If the user operation via the operation unit 310 is an operation for changing the development parameter (S107), the changed development parameter is stored in the volatile memory 304 (S108). In this case, the white balance is changed from "Auto" to "Sunlight". Since the white balance is not an optical system correction parameter (S109), the process returns to step S103, in which redevelopment processing is executed upon setting the magnification chromatic aberration "OFF" (S104), the development processing result is displayed (S105), and a GUI is generated and displayed (S106). Reference numeral 201 in FIG. 3A exemplifies the processing result in this case.

If the magnification chromatic aberration is changed from "OFF" to "ON" via the operation unit 310 (S107 & S108), this means that the optical system correction parameter is changed (S109), so it takes much time to perform redevelopment processing. Therefore, the current image is displayed again without executing redevelopment processing (S105), and the GUI is updated (S106). Reference numeral 202 in FIG. 3A exemplifies the processing result in this case. Reference numeral 202 in FIG. 3A exemplifies parameters used in actual redevelopment processing. Although the magnification chromatic aberration is "OFF" in actual development processing, magnification chromatic aberration "ON" is displayed in [GUI Display] because the magnification chromatic aberration is set "ON" by the user. Although a contradiction has arisen between the image of the development processing result and the parameter displayed on the GUI, the effect of optical system correction parameters such as the magnification chromatic aberration is so inconspicuous upon fit-size image display that no special disadvantage occurs.

If the contrast is subsequently changed from "Weak" to "Strong" via the operation unit 310 (S107 & S108), this means that the optical system correction parameter is not changed (S109), so the process returns to step S103, in which the magnification chromatic aberration is set "OFF". Redevelopment processing is performed (S104), the development processing result is displayed (S105), and a GUI is generated and displayed (S106). Reference numeral 203 in FIG. 3A exemplifies the processing result in this case. In development processing, the magnification chromatic aberration is set "OFF", but [GUI Display] remains "ON".

If an enlargement operation is subsequently done via the operation unit 310 (S107), the setting detail of the optical system correction parameter is checked. If the optical system correction parameter is "ON" as a setting detail, redevelopment processing is performed using this setting detail (S110). The target image file is developed (S104), the development processing result is displayed (S105), and a GUI is generated and displayed (S106). Reference numeral 204 in FIG. 3A exemplifies the processing result in this case. Because it takes much time to perform optical system correction processing, "Processing in Progress", for example, is displayed until an enlarged image is displayed. The position at which an enlarged image is displayed may be determined by defining the image center as the center of the enlargement position or by analyzing a portion, that is more likely to be corrected, by image processing and defining the extracted portion as the image center.

If an operation for changing the enlargement position is subsequently done via the operation unit 310 (S107), only the position at which an enlarged image is displayed is changed without specially performing development processing (S111), an image of the designated portion is displayed (S105), and a GUI is generated and displayed (S106). Reference numeral 205 in FIG. 3A exemplifies the processing result in this case. In this operation for changing the enlargement position, a GUI which performs assist display of the current enlargement position and icons describing the operation details used by the operation unit 310 is assumed.

If a reduction operation is subsequently done via the operation unit 310, the current enlargement center position is stored (S112). This is done to store the center position before reduction and use it in the next enlargement process so as to spare the user the trouble of designating the enlargement center position every enlargement process because the enlargement position can move and an operation for repeating enlargement and reduction processes is assumed. The image is reduced (S113), a fit image is displayed (S105), and a GUI is generated and displayed (S106). In reduction, only resizing of the image data is performed without executing redevelopment processing (S113), so the image file immediately after reduction becomes an image in which the optical system correction parameter is "ON". Reference numeral 206 in FIG. 3A exemplifies the processing result in this case.

If a saving operation is subsequently done via the operation unit 310, the optical system correction parameter is applied in order to execute development processing for the final image data (S114), development processing is executed (S115), a file is newly generated (S116), and this file is written on the memory card. The header information of the image file generated at this time describes, for example, various parameters used in redevelopment processing and information indicating that this image file is an image file having undergone redevelopment processing. Lastly, a newly generated image file is displayed (S117), and the development processing ends. Reference numeral 207 in FIG. 3A exemplifies the processing result in this case, and [File Name] is added to [GUI Display]. Instead of displaying the resultant image newly generated in step S117, the process may return to the target image selection processing (S100).

If an operation irrelevant to redevelopment processing is done via the operation unit 310 (S107), the process ends.

According to this embodiment, even when the optical system correction parameter is changed, redevelopment processing to which the optical system correction parameter is applied is not performed because it is difficult to check the effect of the redevelopment processing for the size of the display unit of the image sensing apparatus and it takes much time to perform image processing. This reduces the arithmetic processing load imposed on the redevelopment processing to make it possible to suppress degradation in operability and to improve the visibility of the redeveloped image.

Second Embodiment

Figure 2B:
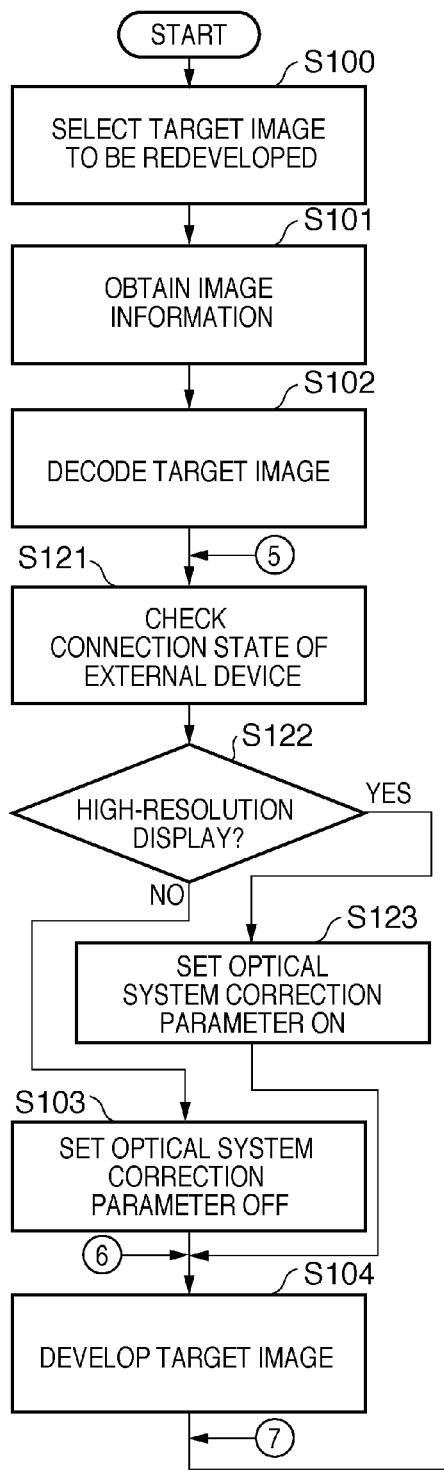
Figure 1:
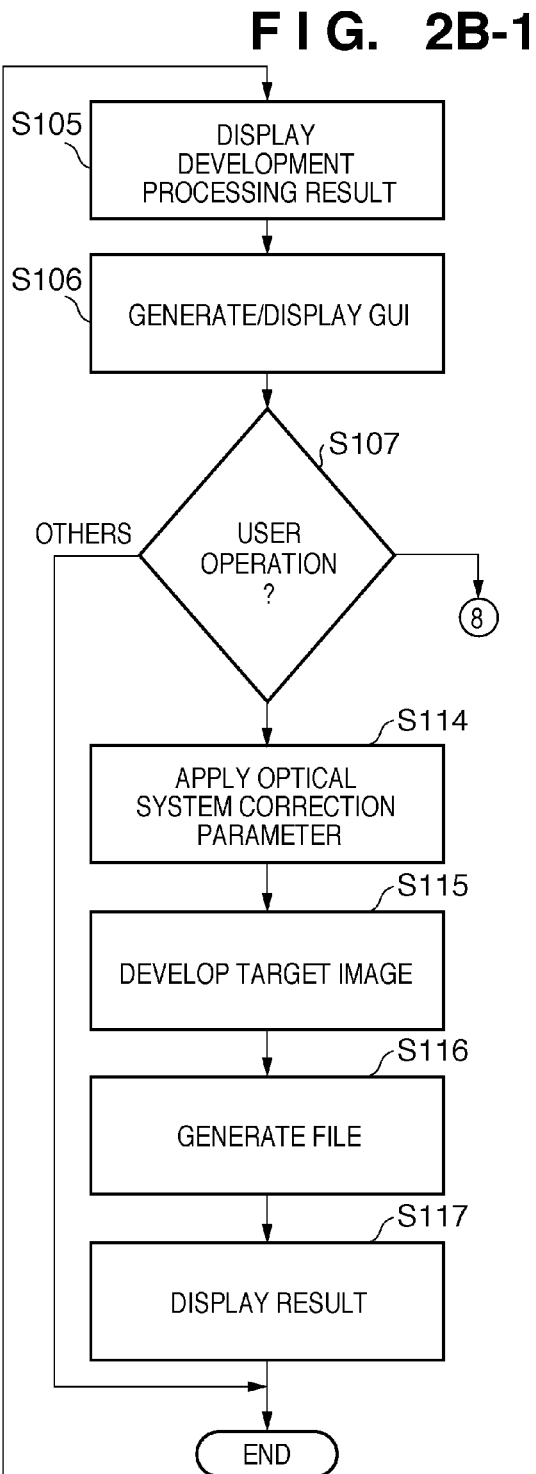
Figures 2, 2B:
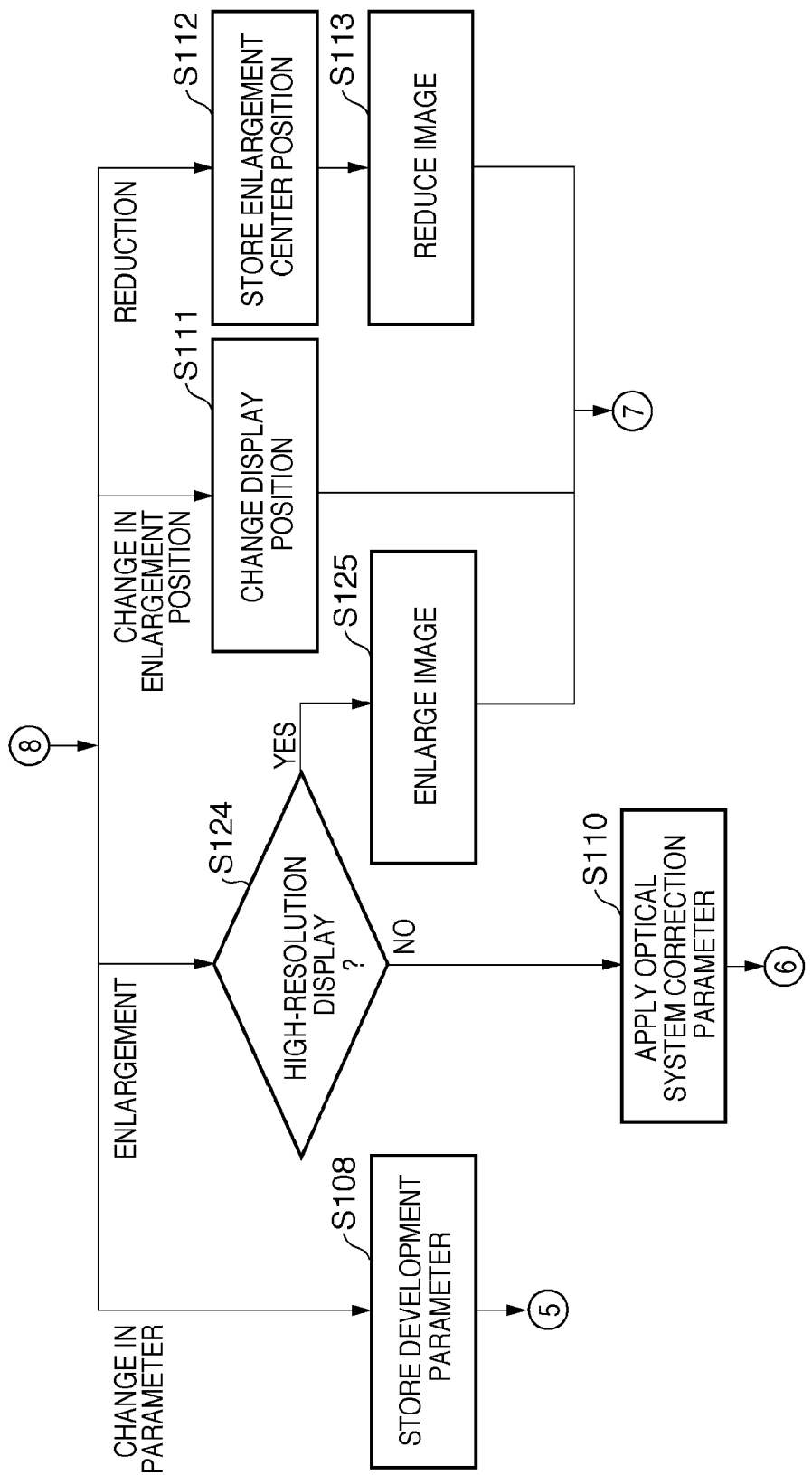

The second embodiment according to the present invention will be described next with reference to FIGS. 2B-1 and 2B-2. In the second embodiment, when an image sensing apparatus is connected to an external display device capable of displaying an image with a resolution higher than the image sensing apparatus, and an image is displayed on the display device at a high resolution, redevelopment processing to which the optical system correction parameter is applied is executed even if enlarged display is not performed. FIGS. 2B-1 and 2B-2 are flowcharts showing redevelopment processing by the image sensing apparatus according to the second embodiment, and the same reference numerals denote the same processes as in FIGS. 2A-1 and 2A-2, so a description thereof will not be given. The redevelopment processing in this embodiment is implemented when a microcomputer 303 of the image sensing apparatus shown in FIG. 1 loads a redevelopment processing program stored in a nonvolatile memory 305 into a volatile memory 304 and executes this program, unless otherwise specified.

The following description assumes that the external device is a display device (to be referred to as an HDMI monitor hereinafter) for which HDMI connection is available.

Referring to FIGS. 2B-1 and 2B-2, after the processes in steps S100 to S102, the microcomputer 303 confirms whether the apparatus is connected to an HDMI monitor via a connection unit 311 and an image is displayed at a high resolution (S121 & S122). If the apparatus is connected to an HDMI monitor and an image is displayed at a high resolution, the optical system correction parameter is set "ON" (S123 & S104) to always execute redevelopment processing to which the optical system correction parameter is applied. However, if the apparatus is not connected to an HDMI monitor or an image is not displayed at a high resolution, redevelopment processing is executed upon setting the optical system correction parameter "OFF" (S103 & S104), as in the first embodiment. At the start of processing, the apparatus is in a shooting state, so a display unit 309 displays a GUI and a development processing result, as exemplified by reference numeral 208 in FIG. 3B (S104-S106).

If the white balance is subsequently changed from "Auto" to "Sunlight" via an operation unit 310, the changed parameter is stored in the volatile memory 304 (S108), and the process returns to step S121. In this case, the display unit 309 displays a GUI and a development processing result, as exemplified by reference numeral 209 in FIG. 3B (S104-S106).

If the magnification chromatic aberration is changed from "OFF" to "ON" via the operation unit 310, the changed parameter is stored (S108), and the process returns to step S121, as in the case in which the white balance is changed. In this case, the display unit 309 displays a GUI and a development processing result, as exemplified by reference numeral 210 in FIG. 3B (S104-S106). Although redevelopment processing is executed upon setting the optical system correction parameter "OFF" in the first embodiment, the development processing result is visible even for a fit image size in high-resolution display and redevelopment processing is executed upon setting the optical system correction parameter "ON" in the second embodiment.

If an enlargement operation is subsequently done via the operation unit 310 (S107), the microcomputer 303 confirms whether the apparatus is connected to an HDMI monitor via the connection unit 311 and an image is displayed at a high resolution (S124). If an image is displayed at a high resolution, there is no need to execute redevelopment processing, so only image enlargement processing is executed (S125). In this case, the display unit 309 displays a GUI and a development processing result, as exemplified by reference numeral 211 in FIG. 3B (S105 & S106). However, if it is determined in step S124 that an image is not displayed at a high resolution, redevelopment processing to which the optical system correction parameter is applied is executed (S110 & S104-S106), as in the first embodiment.

If an operation for changing the enlargement position is subsequently done via the operation unit 310 (S107), only the position at which an enlarged image is displayed is changed without specially performing development processing (S111). In this case, the display unit 309 displays a GUI and a development processing result, as exemplified by reference numeral 212 in FIG. 3B (S105 & S106).

If a reduction operation is subsequently done via the operation unit 310, the current enlargement center position is stored (S112), and the image is reduced (S113), as in the first embodiment. In this case, the display unit 309 displays a GUI and a development processing result, as exemplified by reference numeral 213 in FIG. 3B (S105 & S106).

If a saving operation is subsequently done via the operation unit 310, the optical system correction parameter is applied in order to execute development processing for the final image data (S114), and development processing is executed (S115). A file is newly generated (S116), and is written on the memory card. In this case, the display unit 309 displays a GUI and a development processing result, as exemplified by reference numeral 214 in FIG. 3B (S117).

According to this embodiment, when the apparatus is connected to an external device and an image is displayed at a high resolution, redevelopment processing to which the optical system correction parameter is applied is executed even if enlarged display is not performed. This allows the user to always check the redevelopment processing result.

Third Embodiment

Figures 1, 2C:
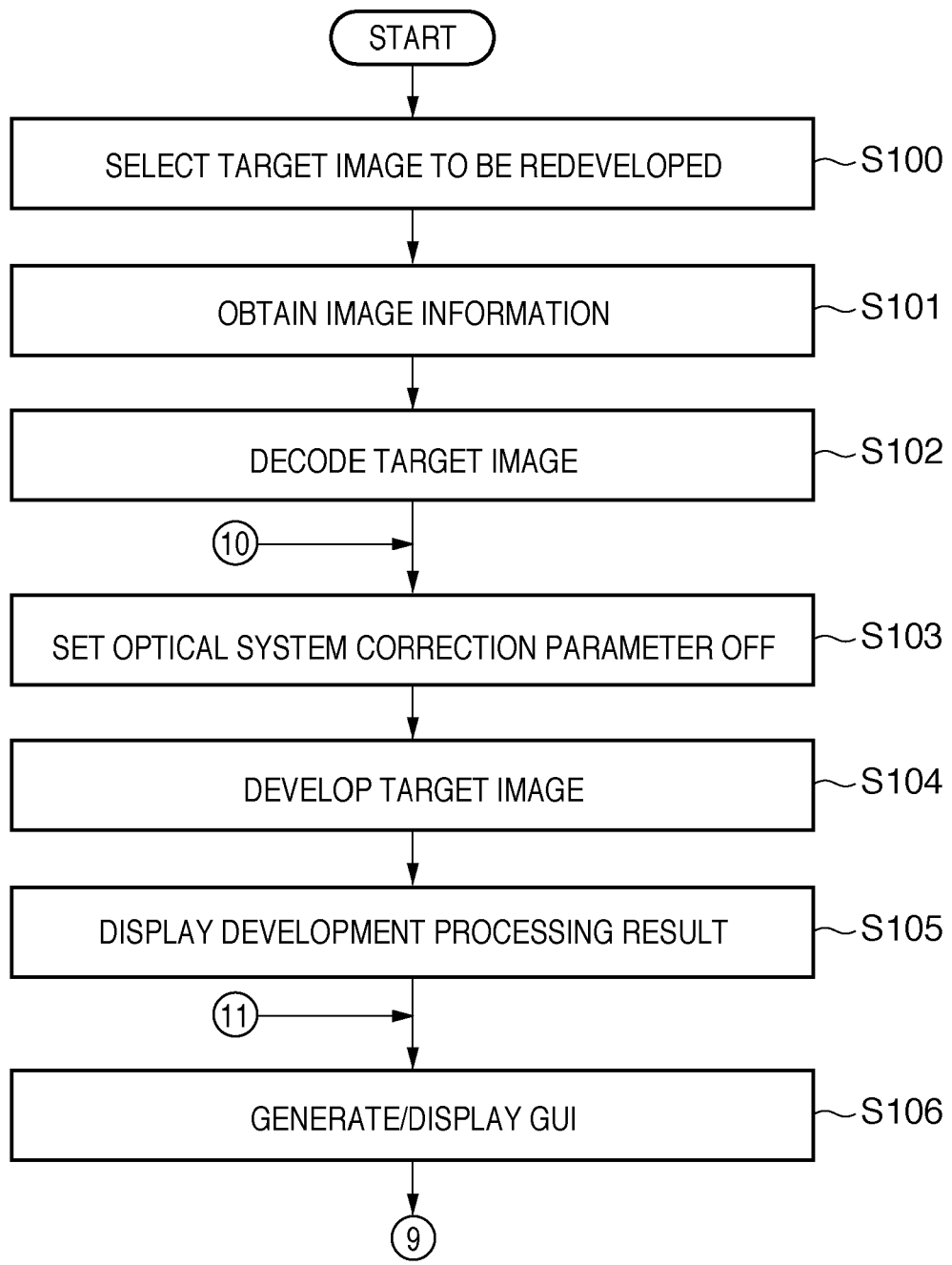
Figures 2, 2C:
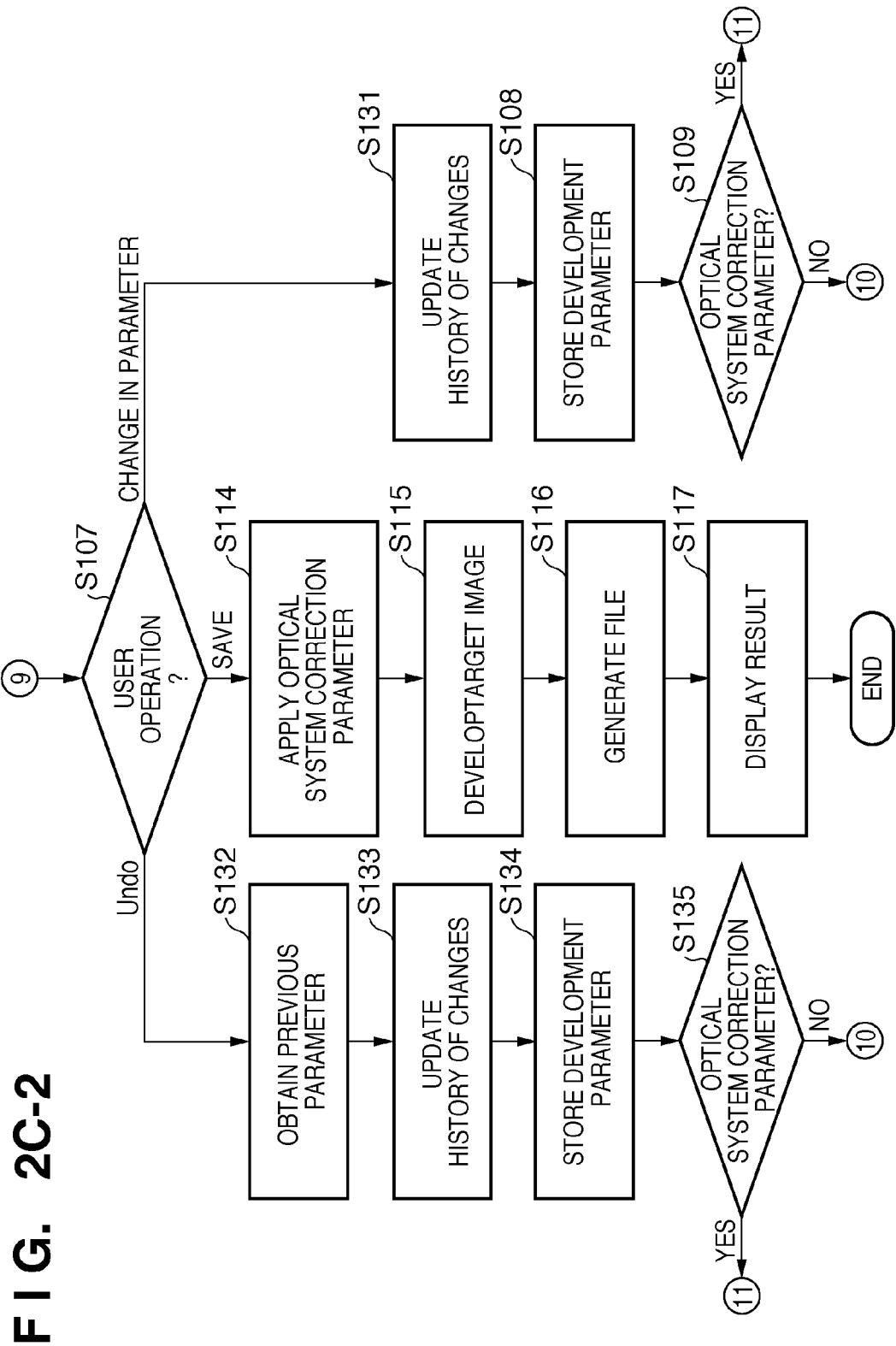

A procedure for executing redevelopment processing when undo processing for making a return to the parameter set for the last time is executed in changing the optical system correction parameter will be described next as the third embodiment according to the present invention with reference to FIGS. 2C-1 and 2C-2. FIGS. 2C-1 and 2C-2 are flowcharts showing redevelopment processing by an image sensing apparatus according to the third embodiment, and the same reference numerals denote the same processes as in FIGS. 2A-1 and 2A-2, so a description thereof will not be given. The redevelopment processing in this embodiment is implemented when a microcomputer 303 of the image sensing apparatus shown in FIG. 1 loads a redevelopment processing program stored in a nonvolatile memory 305 into a volatile memory 304 and executes this program, unless otherwise specified.

Note that a description of enlargement and reduction operations will not be given below.

Referring to FIGS. 2C-1 and 2C-2, after the processes in steps S100 to S105, a display unit 309 displays a GUI and a development processing result, as exemplified by reference numeral 215 in FIG. 3C (S106).

If the white balance is subsequently changed from "Auto" to "Sunlight" via an operation unit 310 (S107), the history of changes in parameter is updated (S131) and is stored in the volatile memory 304 (S108). At this time, the volatile memory 304 holds not only the current parameter but also the parameter set for the last time. In this case, "White Balance" is stored as the type of parameter set for the last time, and "Auto" is stored as its set value. Since the changed parameter is not an optical system correction parameter (S109), the process returns to step S103. In this case, the display unit 309 displays a GUI and a development processing result, as exemplified by reference numeral 216 in FIG. 3C (S103-S106).

If an undo operation is done via the operation unit 310, the history of changes in parameter stored in step S108, the type of previous parameter, and its set value are obtained (S132). To make a return to the previous parameter, the history of changes in parameter is updated (S133) and is stored in the volatile memory 304 (S134). Since the previous parameter is not an optical system correction parameter (S135), the process returns to step S103. In this case, the display unit 309 displays a GUI and a development processing result, as exemplified by reference numeral 217 in FIG. 3C (S103-S106), and a return to the immediately preceding setting is made, so the same GUI and development processing result as exemplified by reference numeral 215 in FIG. 3C are displayed.

If the magnification chromatic aberration is changed from "OFF" to "ON" via the operation unit 310, the history of changes in parameter is updated (S131) and stored in the volatile memory 304 (S108). In this case, the changed parameter is an optical system correction parameter (S109), so only GUI updating is performed without executing redevelopment processing (S106). In this case, the display unit 309 displays a GUI and a development processing result, as exemplified by reference numeral 218 in FIG. 3C.

If an undo operation is done via the operation unit 310, the type of immediately preceding parameter stored in step S108 and its set value are obtained (S132). In this case, the type of immediately preceding parameter is "Magnification Chromatic Aberration" and its set value is "OFF", so the history of changes in parameter is updated (S133) and is stored in the volatile memory 304 (S134). Note that the magnification chromatic aberration is an optical system correction parameter, so only GUI updating is performed without executing redevelopment processing (S106). In this case, the display unit 309 displays a GUI and a development processing result, as exemplified by reference numeral 219 in FIG. 3C.

Lastly, if a saving operation is subsequently done via the operation unit 310, the processes in steps S114 to S117 are performed, as in the first embodiment.

Although undo processing in changing the parameter has been described above, this processing is also applicable when, for example, the enlargement, the reduction, and the change in enlargement position, having been described in the first and second embodiments, are performed. For example, if an undo operation is done after an image is enlarged upon applying the optical system correction parameter, the image may be simply returned to have a fit size without executing development processing which requires much time in undo processing.

According to this embodiment, even when the optical system correction parameter is changed in an undo operation, redevelopment processing to which the optical system correction parameter is applied is not executed. This reduces the arithmetic processing load imposed on the redevelopment processing to make it possible to suppress degradation in operability and to improve the visibility of the redeveloped image.

Although redevelopment processing for raw image data has been taken as an example in the first to third embodiments, the present invention is also applicable when the image sensing apparatus executes processing which requires much time, such as filter processing.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-145527, filed Jun. 25, 2010, which is hereby incorporated by reference herein in its entirety.

What is claimed is:

1. An image sensing apparatus comprising:
an image sensing unit configured to capture an object to obtain image data;
a saving unit configured to save the image data obtained by said image sensing unit;
a development processing unit configured to read out the image data saved in said saving unit and execute development processing for the image data to generate new image data;
a setting unit configured to set a parameter for use in the development processing;
a display unit configured to display a result of executing development processing by said development processing unit using the parameter set by said setting unit; and
an operation unit configured to allow a user to change image display mode from fit-size image display to enlarged image display of the image displayed on said display unit,
wherein when said setting unit sets a first parameter for which optical system correction processing is not performed and a second parameter for which a predetermined optical system correction processing is performed, said development processing unit executes development processing to generate one new image data, to which only the first parameter is applied, when a change to enlarged image display is not made by said operation unit, and said development processing unit executes development processing to generate one new image data, to which both the first parameter and the second parameter are applied, when a change to enlarged image display is made by said operation unit.

2. The apparatus according to claim 1, wherein the image data saved in said saving unit includes raw image data.

3. The apparatus according to claim 2, wherein
when the enlarged image display is not performed, said development processing unit does not execute development processing, to which the second parameter is applied, even if the second parameter is changed by said setting unit,
when a change to the enlarged image display is made, said development processing unit executes development processing to which the second parameter is applied, and
said display unit displays the parameter changed by said setting unit, and displays a result of executing development processing by said development processing unit.

4. The apparatus according to claim 3, wherein when a change from the enlarged image display to the original display is made, said display unit displays the parameter changed by said setting unit, and displays a result of executing development processing to which the second parameter is applied.

5. The apparatus according to claim 2, further comprising:
a connection unit configured to connect the image sensing apparatus to a display device capable of displaying an image with a resolution higher than the image sensing apparatus,
wherein when the image sensing apparatus is connected to the display device, said development processing unit executes redevelopment processing, to which the second parameter changed by said setting unit is applied, even when the enlarged image display is not performed, and both the parameter changed by said setting unit and a result of executing development processing by said development processing unit are displayed on the display device.

6. The apparatus according to claim 1, wherein
said setting unit includes a storage unit configured to store a history of changes in the parameter, and a unit configured to make a return to the parameter set for the last time, based on the history of changes,
when the parameter set for the last time is the second parameter, said development processing unit does not execute development processing, to which the second parameter is applied, when the enlarged image display is not performed,
said development processing unit executes development processing, to which the second parameter is applied, when the enlarged image display is performed, and
said display unit displays the parameter changed by said setting unit, and displays a result of executing development processing by said development processing unit.

7. A control method of an image sensing apparatus including an image sensing unit configured to capture an object to obtain image data; a saving unit configured to save the image data obtained by the image sensing unit; a development processing unit configured to read out the image data saved in the saving unit and execute development processing for the image data to generate new image data; a setting unit configured to set a parameter for use in the development processing; a display unit configured to display a result of executing development processing by the development processing unit using the parameter set by the setting unit; and an operation unit configured to allow a user change image display mode from fit-size image display to enlarged image display of the image displayed on the display unit, the method comprising the steps of:

executing, when the setting unit sets a first parameter for which optical system correction processing is not performed and a second parameter for which a predetermined optical system correction processing is performed, development processing to generate one new image data, to which only the first parameter is applied, when a change to enlarged image display is not made by the operation unit; and executing development processing to generate one new image data, to which both the first parameter and the second parameter are applied, when a change to enlarged image display is made by the operation unit.

* * * * *